(12) United States Patent
Peisachov

(10) Patent No.: US 9,495,281 B2
(45) Date of Patent: Nov. 15, 2016

(54) USER INTERFACE COVERAGE

(71) Applicant: Hewlett Packard Enterprise Development LP, Houston, TX (US)

(72) Inventor: Yael Peisachov, Petah Tikva (IL)

(73) Assignee: Hewlett Packard Enterprise Development LP, Houston, TX (US)

( * ) Notice: Subject to any disclaimer, the term of this patent is extended or adjusted under 35 U.S.C. 154(b) by 196 days.

(21) Appl. No.: 13/683,064

(22) Filed: Nov. 21, 2012

(65) Prior Publication Data

US 2014/0143758 A1    May 22, 2014

(51) Int. Cl.
G06F 9/44       (2006.01)
G06F 11/36     (2006.01)

(52) U.S. Cl.
CPC .................. G06F 11/3676 (2013.01)

(58) Field of Classification Search
CPC .................................. G06F 11/3676
USPC ........................................ 717/125
See application file for complete search history.

(56) References Cited

U.S. PATENT DOCUMENTS

| | | | |
|---|---|---|---|
| 6,502,102 B1* | 12/2002 | Haswell et al. | |
| 7,203,930 B1* | 4/2007 | Kirkpatrick et al. | 717/125 |
| 8,185,877 B1* | 5/2012 | Colcord | 717/127 |
| 2002/0183956 A1* | 12/2002 | Nightingale | 702/120 |
| 2003/0098879 A1* | 5/2003 | Mathews | G06F 11/3688 715/762 |
| 2003/0208744 A1* | 11/2003 | Amir et al. | 717/124 |
| 2003/0229889 A1* | 12/2003 | Kuzmin | G06F 11/3688 717/130 |
| 2005/0120276 A1* | 6/2005 | Kolawa et al. | 714/38 |
| 2005/0172270 A1* | 8/2005 | Dathathraya et al. | 717/124 |
| 2006/0010426 A1* | 1/2006 | Lewis et al. | 717/124 |
| 2007/0079280 A1* | 4/2007 | Schultz | G06F 11/3684 717/104 |
| 2008/0168425 A1* | 7/2008 | Sen et al. | 717/124 |
| 2009/0083269 A1* | 3/2009 | Artz et al. | 707/6 |
| 2009/0144698 A1* | 6/2009 | Fanning | G06F 8/75 717/120 |
| 2009/0265689 A1 | 10/2009 | Gooi et al. | |
| 2009/0320002 A1* | 12/2009 | Peri-Glass et al. | 717/131 |
| 2010/0023928 A1* | 1/2010 | Hentschel et al. | 717/124 |
| 2011/0225566 A1 | 9/2011 | Muharsky et al. | |
| 2011/0239214 A1* | 9/2011 | Frields et al. | 718/1 |
| 2011/0307865 A1 | 12/2011 | Grieves et al. | |
| 2012/0222014 A1 | 8/2012 | Peretz et al. | |
| 2013/0074001 A1* | 3/2013 | Meirman et al. | 715/781 |

OTHER PUBLICATIONS

Belli, et al, "Event-based Modelling, Analysis and Testing of User Interactions: Approach and Case Study," Nov. 8, 2005, vol. 16, Issue: 1, pp. 3-32.
Unknown., "Microsoft Visual Studio Testing Tools Quick Start (10 Days)," Sep. 2012, 2 pages.

* cited by examiner

Primary Examiner — James D Rutten
(74) Attorney, Agent, or Firm — Brooks, Cameron & Huebsch, PLLC

(57) ABSTRACT

Systems, machine readable media, and methods are provided. An example method can include populating cells of a matrix with a plurality of user interface (UI) configuration parameters to determine a total number of testable UI configurations, reducing a number of the cells of the matrix by combining at least two UI configuration parameters to determine a reduced number of UI configurations to test, executing a number of predetermined tests, where test results depend on input of the reduced number of UI configurations, and determining the UI coverage based upon the test results.

20 Claims, 11 Drawing Sheets

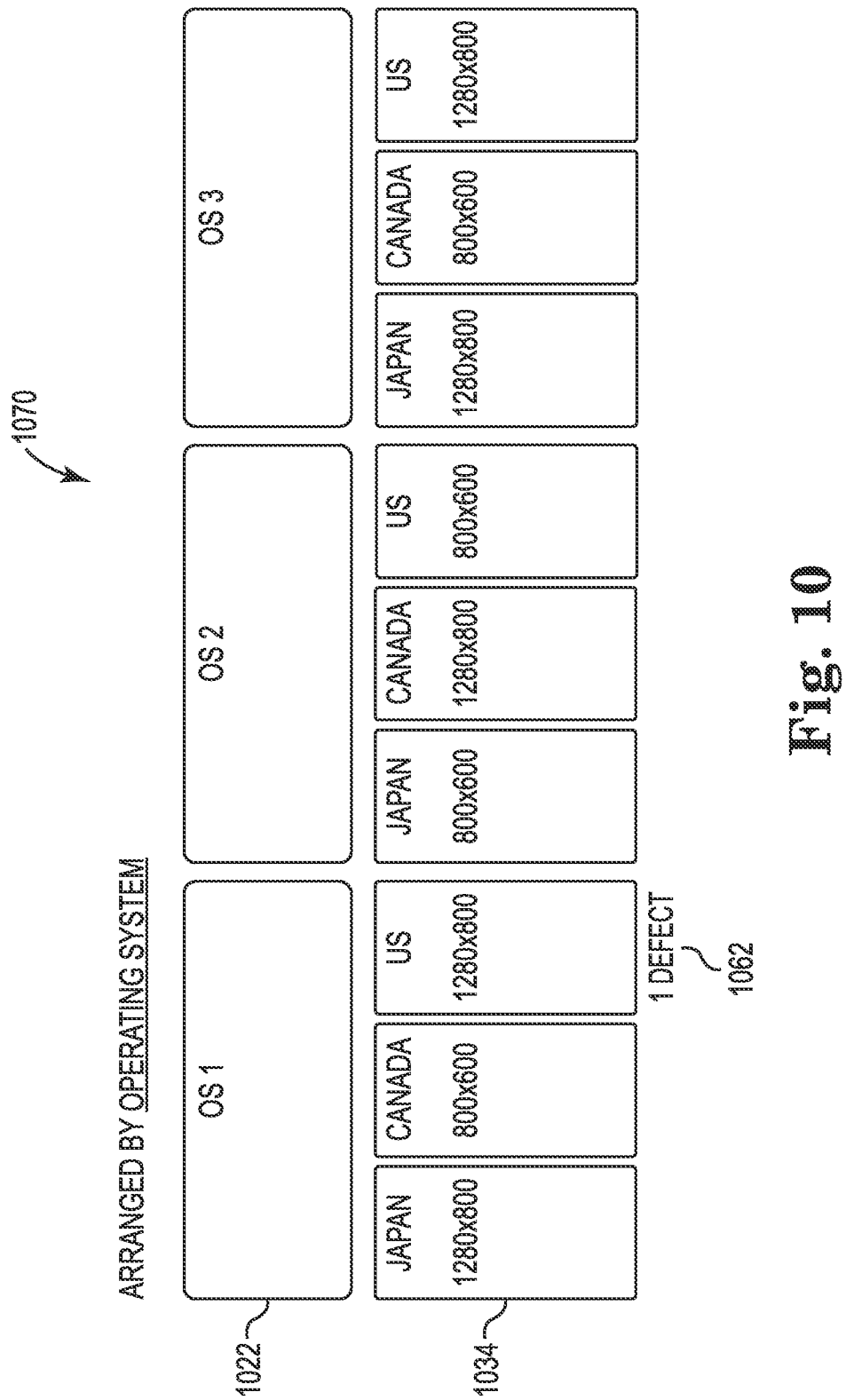

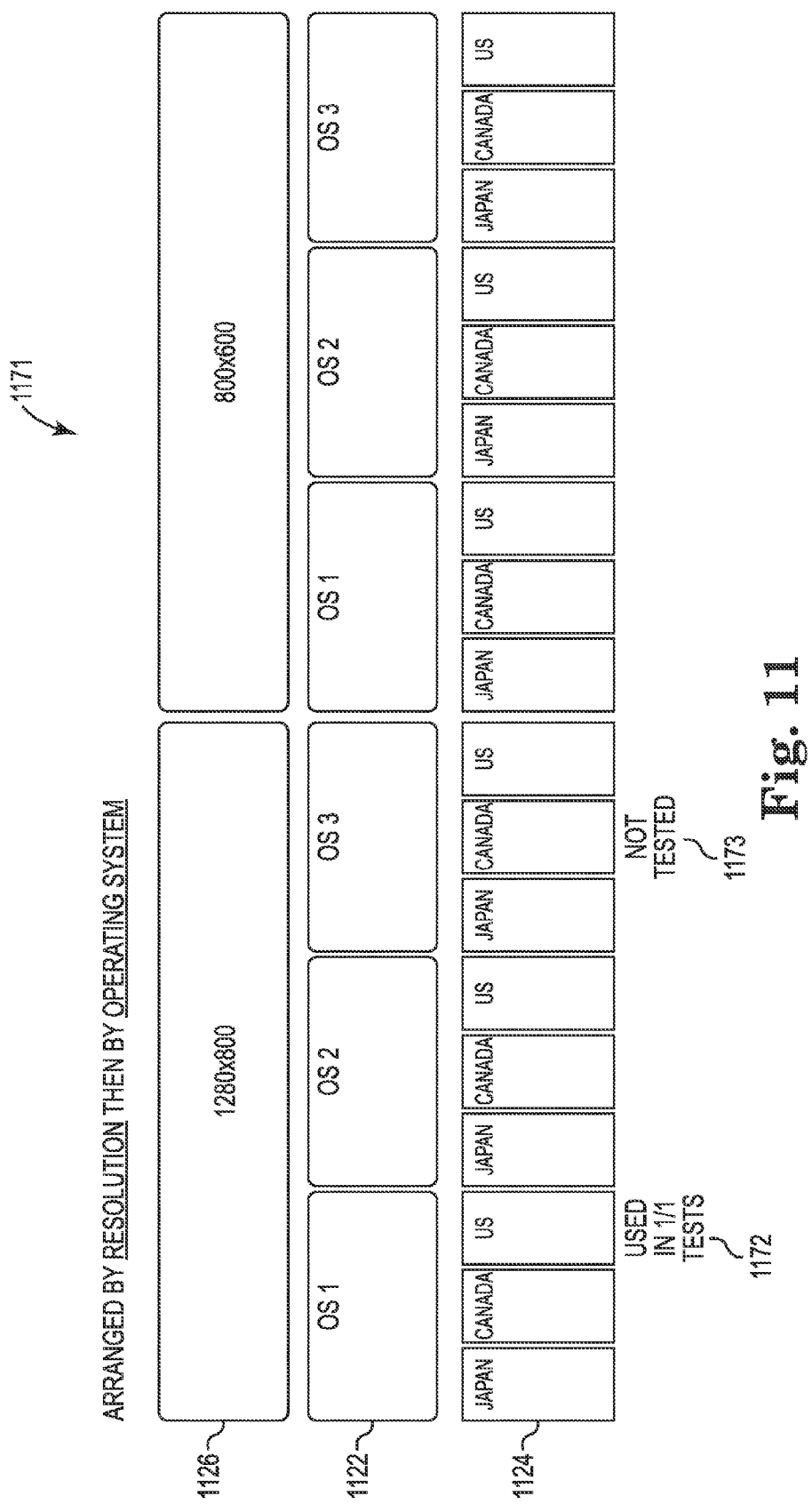

USER INTERFACE COVERAGE

BACKGROUND

A challenge in the development of an application is that a user interface (UI) that is developed for the application might be used with various client environments having many different combinations of configuration parameters (e.g., configurations). For instance, such configuration parameters could include different operating systems, different browsers, different languages, different locales, and/or different resolutions, among others.

BRIEF DESCRIPTION OF THE DRAWINGS

FIG. 10 illustrates an example of arranging a display of UI coverage by operating system in a representation of the parameters of the UI configurations according to the present disclosure.

FIG. 11 illustrates an example of arranging a display of UI coverage by resolution in a representation of the parameters of the UI configurations according to the present disclosure.

DETAILED DESCRIPTION

Figure 1:
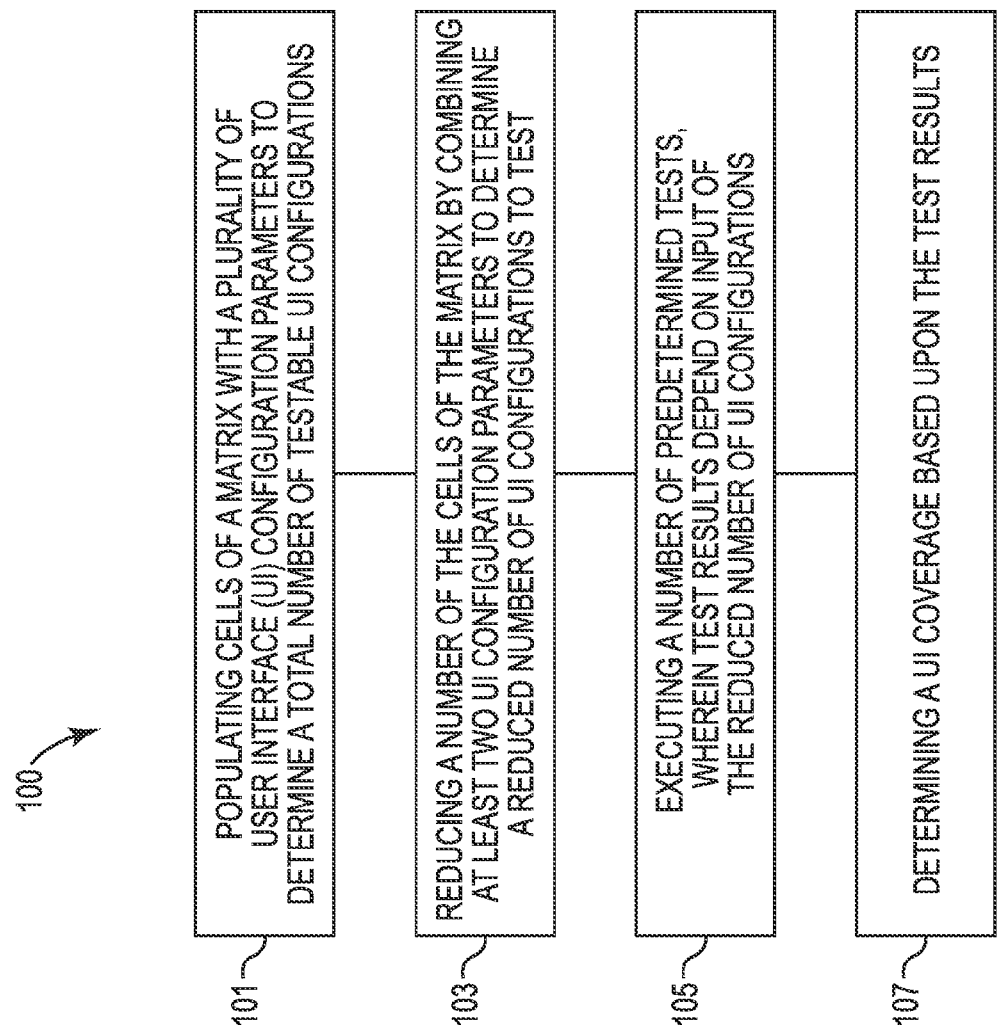
FIG. 1 illustrates a block diagram of an example method for determining UI coverage according to the present disclosure.

A UI developer may not know how the UI is going to appear on an operating system, browser, language, locale, and/or resolution, among other possible configuration parameters, different than the ones utilized on the machine on which the UI was developed. A quality assurance (QA) engineer who tests the UI may install it on multiple machines (e.g., computers) having different combinations of configuration parameters, but the ability to cover all of the possibilities is limited. The QA engineer may not have a simple way to test, document, and/or track coverage of the UI. For instance, when the QA engineer finds a defect in the appearance of the UI on a particular machine, the QA engineer may have to manually document the machine details and then the UI developer may have to try to set up the same environment on a different machine to reproduce the defect. Ultimately, a project manager (PM) may wind up not knowing whether a certain configuration was covered and to what extent.

For example, if only the operating system, browser, language, locale, and resolution configuration parameters are considered, with 3 options for each, a UI matrix with 243 cells representing different configurations would result. As such, it would be a challenge in the development of applications if the UI for every application were to be tested on all the different configurations that might be used in various client environments. Manually testing the UI of the application on each of the possible configurations may use too many resources (e.g., cost, time, machines, QA engineers, etc.) and may present difficulties in tracking of results and/or management of the testing.

In the present disclosure, "coverage" is intended to mean an extent to which a UI of a particular application (e.g., an application that is displayable on a graphical UI (GUI), such as a monitor, connected to an operating system) has been tested. Coverage can be measured in different ways. Measurements of UI coverage can, by way of example and not by way of limitation, include: a number or a percentage of defined tests out of all defined tests that were executed; a number or a percentage of configuration parameters, as defined herein, covered in the testing; and/or a number or a percentage of components of the application that were tested for accessibility and/or usability with the UI; among other possibilities.

Some available tools may be better suited for web developers (e.g., for cross-browser testing), than for QA. For instance, available tools may be limited by not covering the configuration parameters previously mentioned. The available tools may not reduce effort in a tester's day-to-day working environment; they may add additional tasks to it. The available tools may not provide an overall view of the testing efforts and their results.

In contrast, the present disclosure describes methods, non-transitory machine readable media with machine readable instructions stored thereon, and systems to streamline the UI development and testing lifecycle. Doing so can more clearly define the extent of UI coverage, can reduce occurrences of manually setting up and/or configuring machines for UI testing, can assist developers in fixing defects that are reproduced on configurations other than the one on which they were originally developed, and/or can provide a clearer view of the coverage status of the UI in the various environments, among other benefits.

Examples of the present disclosure include methods, machine readable media, and systems for determining UI coverage. An example method can include populating cells of a matrix with a plurality of UI configuration parameters to determine a total number of testable UI configurations, reducing a number of the cells of the matrix by combining at least two UI configuration parameters to determine a reduced number of UI configurations to test, executing a number of predetermined tests, where test results depend on input of the reduced number of UI configurations, and determining the UI coverage based upon the test results.

FIG. 1 illustrates a block diagram of an example method 100 for determining UI coverage according to the present disclosure. Unless explicitly stated, the method examples described herein are not constrained to a particular order or sequence. Additionally, some of the described method examples, or elements thereof, can be performed at the same, or substantially the same, point in time. As described herein, the actions, functions, calculations, data manipulations and/or storage, etc., can be performed by execution of non-transitory machine readable instructions stored in a number of memories (e.g., software, firmware, and/or hardware, etc.) of a number of applications, as described herein. As such, a number of computing resources with a number of personnel interfaces (e.g., interfaces providing access to the UI developer, a business analyst (BA), the PM, and/or the QA engineer, among others) can be utilized for determining UI coverage (e.g., via accessing the number of computing resources in "the cloud" via the personnel interfaces).

In the detailed description of the present disclosure, reference is made to the accompanying drawings that form a part hereof and in which is shown by way of illustration how examples of the disclosure may be practiced. These examples are described in sufficient detail to enable one of ordinary skill in the art to practice the examples of this disclosure and it is to be understood that other examples may be utilized and that process, electrical, and/or structural changes may be made without departing from the scope of the present disclosure. As used herein, "a" or "a number of" an element and/or feature can refer to one or more of such elements and/or features. Further, where appropriate, as used herein, "for example' and "by way of example" should be understood as abbreviations for "by way of example and not by way of limitation".

The figures herein follow a numbering convention in which the first digit or digits correspond to the drawing figure number and the remaining digits identify an element or component in the drawing. Similar elements or components between different figures may be identified by the use of similar digits. For example, 111 may reference element "11" in FIG. 1, and a similar element may be referenced as 211 in FIG. 2. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense.

At 101 in FIG. 1, cells of a matrix can be populated with a plurality of UI configuration parameters to determine a total number of testable UI configurations. For example, a matrix can be constructed that accounts for (e.g., covers) many (e.g., possibly all) of the possibilities for UI configuration parameters. For example, five UI configuration parameters (e.g., operating system, browser, language, locale, and resolution) and 3 options for each parameter would yield a 5-dimensional matrix, where each of its 243 cells would be a specific user-experienced configuration. As described herein, such a large number of configurations could be difficult to test and/or present difficulties in keeping track of test results.

At 103, a number of the cells of the matrix can be reduced by combining at least two UI configuration parameters to determine a reduced number of UI configurations to test. That is, the present disclosure describes determining a reduced number of UI configurations to test. As such, the number of configurations to be tested herein is a subset of the number of cells of the original coverage matrix. For instance, an [operating system, locale, and resolution] combination of parameters can be substituted as a configuration with a reduced number of parameters for the initial [operating system, browser, language, locale, and resolution] parameter configuration.

In some examples, the number of the cells of the matrix can be reduced by combining at least two independent UI configuration parameters. As described herein, independent UI configuration parameters are defined as parameters that infrequently affect each other in terms of UI coverage. For example, locale and resolution can be considered independent in terms of UI testing because, for instance, if testing reveals a defect in UI coverage related to locale, the testing likely would reveal a defect (e.g., the same defect) in the UI coverage in every resolution, and vice versa.

At 105 in FIG. 1, a number of predetermined tests can be executed, where test results depend on input of the reduced number of UI configurations. For example, if a particular combination of options for the reduced number of parameters (e.g., particular selections of [operating system, locale, and resolution] combinations, such as [Windows XP®, Japan, and 1280×800]) is selected as testable configurations, these are the configurations that have various UI functions tested by application of (e.g., automatically) a number of appropriate and predetermined tests (e.g., to test various functions to determine whether expected outcomes result).

In some examples, the number of predetermined tests can include executing a number of predetermined test sets, where each of the test sets comprises a plurality of tests. For example, a test set can be a plurality of tests grouped together into a package intended to be run together (e.g., substantially simultaneously or sequentially) and/or in the same context (e.g., on the same or similar configurations). Such test sets can, for example, include a plurality of tests intended to determine functionality of various pathways and/or subsystems of the UI and/or appropriate functionality of downstream system applications accessed through the UI, among other testable UI determinations.

Such tests and test sets can, for example, be executed repeatedly during development of a UI to determine possible advancement and/or regression in the functionality and/or operability of the UI and/or the system applications accessed through the UI. In some examples of the present disclosure, the number of predetermined tests and/or test results can be executed on an application displayable on a number of GUIs, each of which can have a number of personnel interfaces for input and/or exchange of information (e.g., with authorized personnel).

At 107 in FIG. 1, the UI coverage can be determined based upon the test results. For example, the UI coverage can be determined by determining a number of the predetermined tests that are executed on a number of (e.g., each of) the reduced number of UI configurations and/or by determining a number of defects, as described herein, for a number of (e.g., each of) the reduced number of UI configurations based upon the test results, among other possibilities for determining UI coverage described herein.

Figure 2:
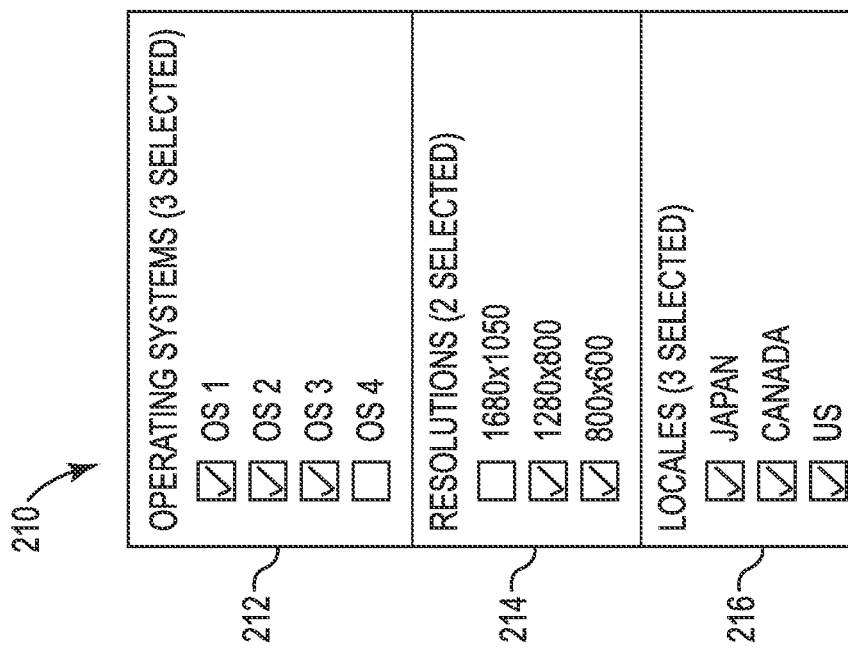
FIG. 2 illustrates an example of selecting supported configuration parameters and options thereof for a UI according to the present disclosure.

FIG. 2 illustrates an example of selecting supported configuration parameters and options thereof for a UI according to the present disclosure. In various examples, a determination is made as to what configuration parameters, as described herein, are to be supported by the UI (e.g., a particular UI product intended to be released by a manufacturer and/or a provider). For example, such a determination can be made (e.g., by a BA or automatically) based on results of analysis of various metrics. Such metrics can include, for example, numbers of users utilizing various operating systems, browsers, languages, locales, and/or resolutions, and/or a cost/benefit analysis of having particular configuration parameters supported by the UI, among other possible configuration parameters and metrics. In some examples, the configuration parameters can be selected by a number of the personnel (e.g., via accessing the number of computing resources in "the cloud" via the personnel interfaces). For example, based on the analysis of the various metrics just presented, the BA can select from a large number of configuration parameters and/or options (e.g., as described with regard to the initial coverage matrix illustrated in FIG. 3). In some examples, the configuration parameters can be displayed for selection, for example, on a number of GUIs.

Accordingly, FIG. 2 illustrates a display 210 for selection of particular configuration parameters supported by the UI (e.g., the particular UI product intended to be released by the manufacturer and/or the provider). By way of example and not by way of limitation, the particular configuration parameters displayed in FIG. 2 include operating systems 212, resolutions 214, and locales 216.

The operating systems 212 displayed in FIG. 2 include four options, although there can be more than or less than four operating system options. The four operating system options are labeled OS 1, OS 2, OS 3, and OS 4 as placeholders for various Windows®, Macintosh®, and/or Unix® operating systems, among others utilizable in computing resources. Various numbers of the options can be selected. For example, as shown in FIG. 2, three out of four of the options can be selected (e.g., OS 1, OS 2, and OS 3). As such, the OS 1, OS 2, and OS 3 operating systems are selected to be included in testing of the particular UI product.

The resolutions 214 displayed in FIG. 2 include three options, although there can be more than or less than three resolution options. Resolution, as described herein, refers to a graphics display resolution described in terms of width and height dimensions of a display, such as a computer monitor, in pixels. For instance, a higher display resolution can mean that displayed content appears with sharper definition. Certain combinations of width and height can become frequently utilized. Such combinations can be given a name and/or initials that are descriptive of such dimensions. The three resolution options displayed in FIG. 2 are labeled 1680×1050, 1280×800, and 800×600 as examples of various resolution options that can be utilized in display of a UI, for example, on a GUI. Various numbers of the options can be selected. For example, as shown in FIG. 2, two out of three of the options can be selected (e.g., 1280×800 and 800×600). As such, the 1280×800 and 800×600 resolutions are selected to be included in testing of the particular UI product.

The locales 216 displayed in FIG. 2 include three options, although there can be more than or less than three locale options. Locale, as described herein, refers to a set of display settings defined by a region, a country, and/or variant preferences that users therein are accustomed to having present in their UI. As such, the display settings can control formatting output on a UI that is appropriate to a particular locale. The display settings (e.g., output format settings) for various locales can, for example, include number format settings, character classifications, case conversion settings, date-time format settings, string collation settings, currency format settings, paper size settings, among other settings. A particular locale can be indicated by, for example, a name of a particular country or a region, where the region can be a portion of a country and/or can include portions or entireties of more than one country (e.g., the United States of America (US), Minnesota, North America, etc.). The three locale options displayed in FIG. 2 are labeled Japan, Canada, and US as examples of various locale options that can be utilized in display of a UI, for example, on a GUI. Various numbers of the options can be selected. For example, as shown in FIG. 2, three out of three of the options can be selected. As such, the Japan, Canada, and US locales are selected to be included in testing of the particular UI product.

Figure 3:
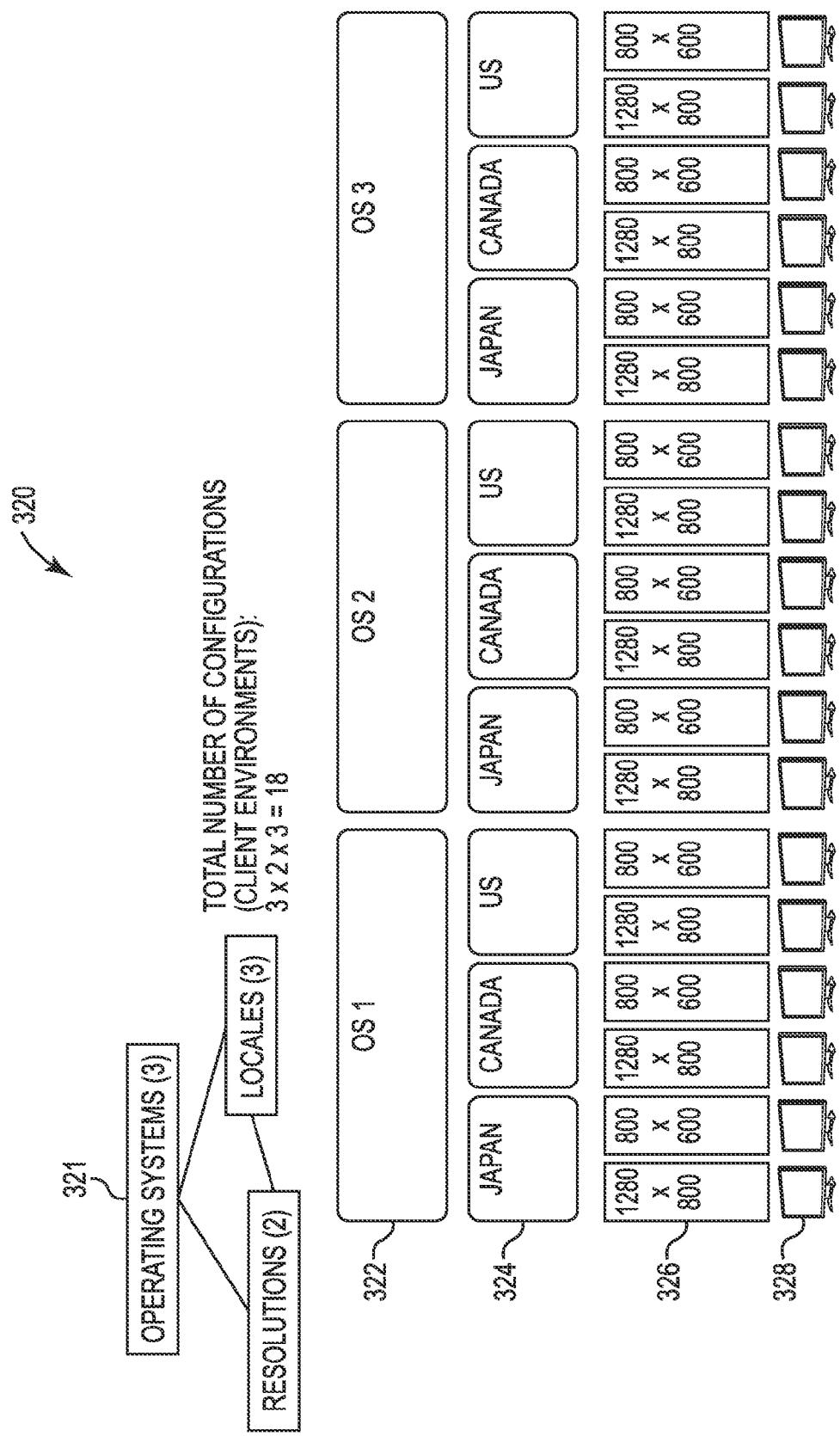
FIG. 3 illustrates an example of an initial coverage matrix according to the present disclosure.

FIG. 3 illustrates an example of an initial coverage matrix according to the present disclosure. The initial coverage matrix 320 illustrated in FIG. 3 includes all of the options described as being selected with regard to FIG. 2. As such, initial coverage matrix 320 includes, as shown at 321, three (3) operating systems, two (2) resolutions, and three (3) locales. A combination of these configuration parameters yields a total number of possible configurations or, as described herein, client environments (e.g., what can be displayed to a user through the UI as affected by selection of various options for the configuration parameters). As such, the total number of configurations (e.g., client environments) shown in FIG. 3 at 321 is eighteen (18) (e.g., as calculated by 3×2×3=18).

Accordingly, a graphical display of the initial coverage matrix 320 can show, for example, the three operating systems 322 (e.g., OS1, OS2, and OS3), the three locales 324 (e.g., Japan, Canada, and US) selected to be tested with each operating system 322, and the two resolutions 326 (e.g., 1280×800 and 800×600) selected to be tested with each operating system 322 and locale 324. The graphical display of the initial coverage matrix 320 shows the total number of client environments 328 to be 18 based on combination of all of the configuration parameters 322, 324, and 326.

Figure 4:
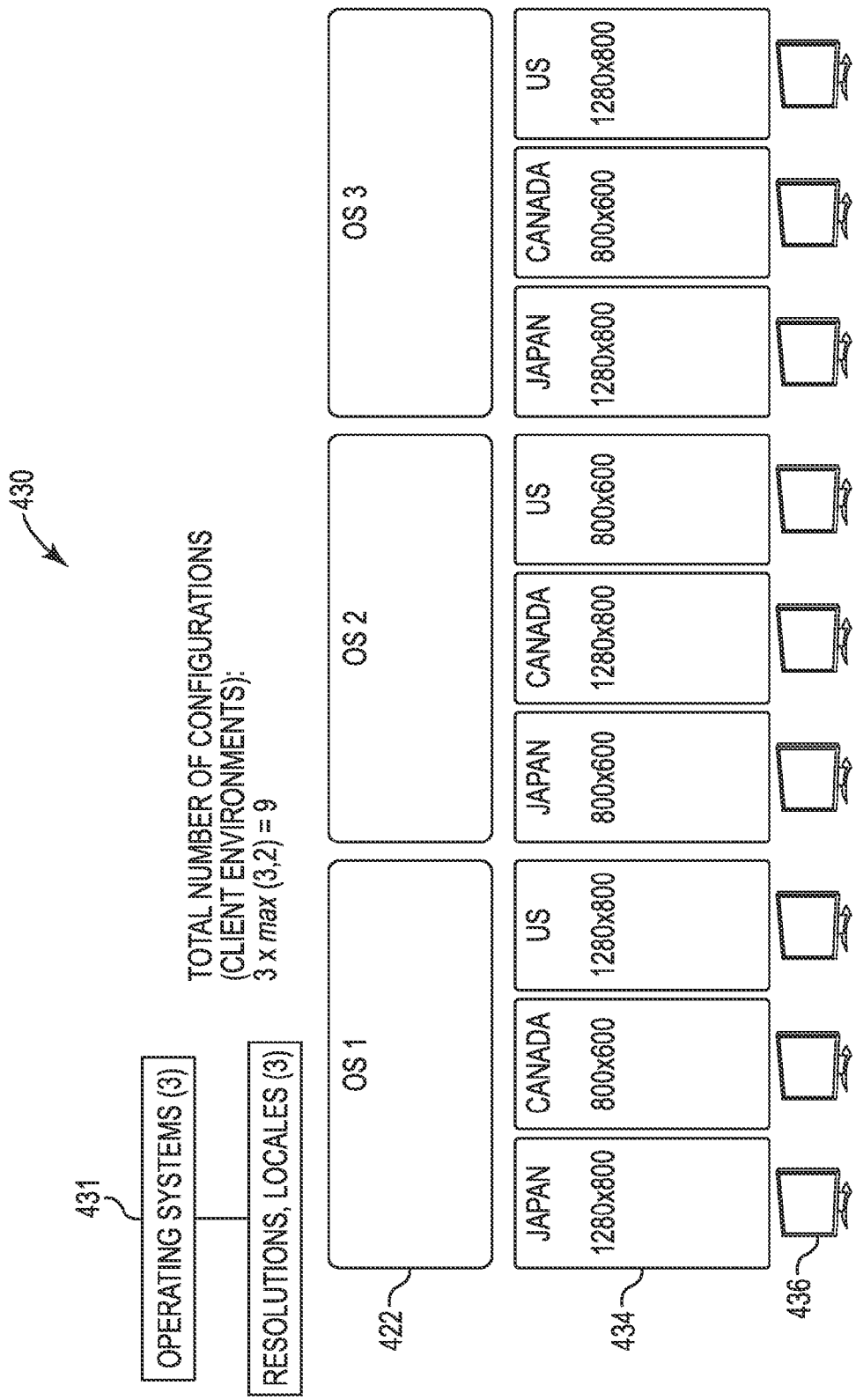
FIG. 4 illustrates an example of a reduced coverage matrix according to the present disclosure.

FIG. 4 illustrates an example of a reduced coverage matrix according to the present disclosure. The reduced coverage matrix 430 illustrated in FIG. 4 shows an example of the number of the cells of the matrix being reduced by combining at least two independent UI configuration parameters. For example, as described herein, locale and resolution can be considered independent in terms of UI testing because, for instance, if testing reveals a defect in UI interface coverage related to locale, the testing likely would reveal a defect (e.g., the same defect) in the UI interface coverage in every resolution, and vice versa. As such, for example, a particular resolution can be selected as representative of a group of selected resolutions to be combined with a selected locale for testing with an operating system. In some examples, a different selected resolution can be combined with the selected locale for testing with a different operating system. Such combinations can be influenced by, for example, frequency of using a particular resolution in combination with a particular locale and/or a particular operating system, among other considerations.

Accordingly, the reduced coverage matrix 430 illustrated in FIG. 4 includes the three (3) options for the operating systems (e.g., OS1, OS2, and OS3) described as being selected with regard to FIG. 2. However, the reduced coverage matrix 430 includes three (3) options of combinations of locale and resolution to be tested with each operating system. As such, reduced coverage matrix 430 includes, as shown at 431, the three (3) operating systems and the three (3) options of combinations of locale and resolution. A combination of these configuration parameters yields a total number of nine (9) configurations (e.g., client environments), as shown in FIG. 4 at 431 as calculated by multiplying the number of operating systems (3) by the maximum number of options in the two that are combined. For example, in the reduced coverage matrix 430 illustrated in FIG. 4, the number of locales is three (3) and the number of resolutions is two (2), which yields a maximum number of 3.

Accordingly, a graphical display of the reduced coverage matrix 430 can show, for example, the three operating systems 422 (e.g., OS1, OS2, and OS3) and the three combinations of locale and resolution 434 selected to be tested with each operating system 422. The graphical display of the reduced coverage matrix 430 shows the total number of client environments 436 to be nine based on combination of the three operating systems 422 and the three combinations of locale and resolution 434. By way of example and not by way of limitation, each of the two resolution options is combined with at least one of the three locale options for testing with each of the three operating system options 422. That is, having the maximum number of options, each of the three locales is tested with each of the three operating systems. However, in various examples, because resolution is determined to be independent of locale in terms of UI testing, each of the two resolution options is not tested with each of the three locale options on each of the three operating system options 422. Each selected parameter option (e.g., resolutions 1280×800 and 800×600) can, in some examples, be tested at least once in a combination.

Combination arrangements and sequences other than shown in the reduced coverage matrix 430 are consistent with the present disclosure. For example, more than two configuration parameters considered to be independent in terms of UI testing can be combined in one grouping, two or more configuration parameters considered to be independent in terms of UI testing can be combined in two or more groupings, and/or groupings can be combined iteratively, among other suitable combination arrangements and sequences.

Moreover, in various examples, the reduced coverage matrix 430 can be arranged based upon any configuration parameter. For example, hierarchical tree structures can be constructed with any configuration parameter (e.g., operating system, browser, language, locale, or resolution) at the base or at any position in the branching.

Figure 5:
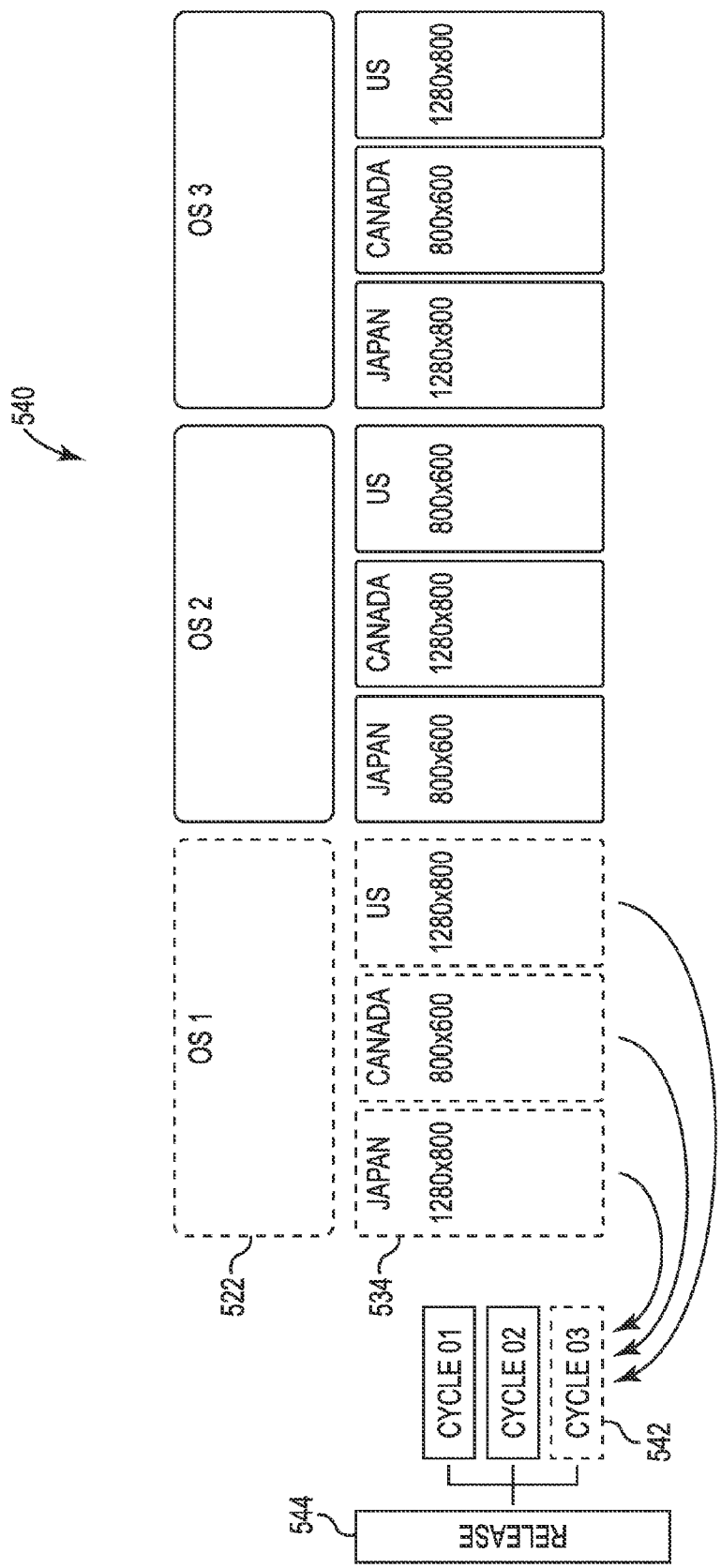
FIG. 5 illustrates an example of distributing configurations to cycles of a release according to the present disclosure.

FIG. 5 illustrates an example of distributing configurations to cycles of a release according to the present disclosure. As described herein, application lifecycle management where the UI is part of the application (e.g., software) can include specified releases and cycles. A release can represent a group of changes in one or more applications that will be available for distribution at the same time. Each release can contain a number of cycles. A cycle can represent a development and QA cycle based on a project timeline. The releases and cycles can have defined start and end dates. For example, a hierarchical release tree containing the cycles and releases can be constructed to organize and track upcoming releases.

However, testing a UI in all the configurations in every cycle can be a challenge based upon limited resources (e.g., time, cost, QA engineers, computers, etc.). Hence, cycles can be planned differently. For example, if 80% of clients use OS 1 and the rest of the clients use OS 2 and OS 3, the configuration parameter options for the operating system can be split into cycles as follows: Cycle 01: OS 1, OS 2; Cycle 02: OS 1, OS 3; and Cycle 03: OS 1, OS 2, OS 3. Splitting the configuration parameter options into cycles as such can enable assigning (e.g., distributing) of particular configuration parameter options less frequently for testing (e.g., testing less frequently those options that are less frequently utilized with a particular UI). Accordingly, various configuration parameters and options thereof can be assigned to a release and can be split between cycles (e.g., manually or using a predefined automated method).

An example of distributing configurations to cycles of the release 540 is illustrated in FIG. 5. The example of the configurations being distributed is indicated by the dashed lines enclosing OS 1 at 522 and the three combinations of locale and resolution at 534 (e.g., the Japan/1280×800, Canada/800×600, and US/1280×800 combinations) selected to be tested with the operating system 522. As such, there are three parameter configurations from the reduced coverage matrix (e.g., as illustrated in FIG. 4) to be distributed to a number of selected cycles. FIG. 5 shows the three parameter configurations being, for example, distributed to Cycle 03 at 542, which can be included in a Release at 544.

Figure 6:
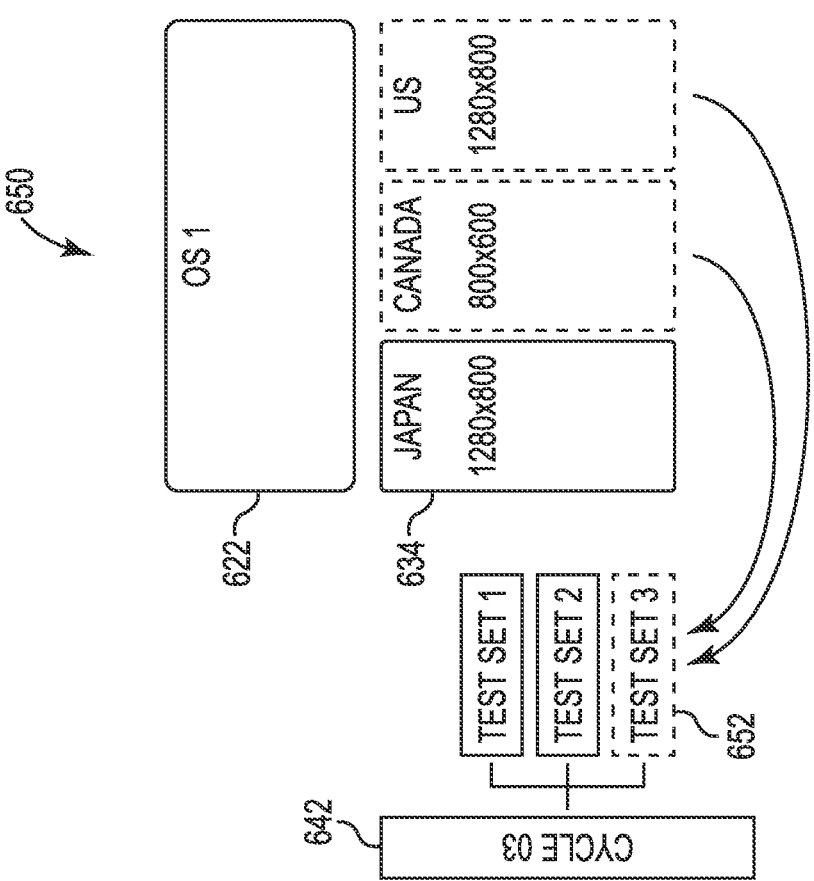
FIG. 6 illustrates an example of assigning configurations to a test set according to the present disclosure.

FIG. 6 illustrates an example of assigning configurations to a test set according to the present disclosure. The example of assigning configurations to the test set 650 illustrates the configuration parameter option of OS 1 at 622 and the three combinations of locale and resolution at 634 selected to be tested with the operating system 622 (e.g., as shown in FIG. 5). In the example of assigning configurations to the test set 650, two out of three of the configurations (e.g., OS 1/Canada/800×600 and OS 1/US/1280×800) are assigned to Test Set 3 at 652.

As described herein, a number of test sets can be associated with a particular cycle. As such, when configurations are distributed to cycles, the configurations can be assigned to test sets within the cycles. When ten configurations are distributed to a particular cycle, for example, five of the configurations can be assigned (e.g., by a QA engineer or automatically based on a number of rules, constraints, etc.) to a first test set and five of the configurations can be assigned to a second test set. As such, for example, three test sets can be associated with Cycle 03 at 642. Assignment to a particular test set can enable a configuration to have various UI functions tested by application of (e.g., automatically) a number of appropriate and predetermined tests. The number of tests can be designed to test functionality of various pathways and/or subsystems of the UI in the selected configurations and/or appropriate functionality of downstream system applications accessed through the UI in the selected configurations, among other testable UI determinations. Issues revealed by results of testing such functionalities can, as described herein, be labeled as "defects".

Figure 7:
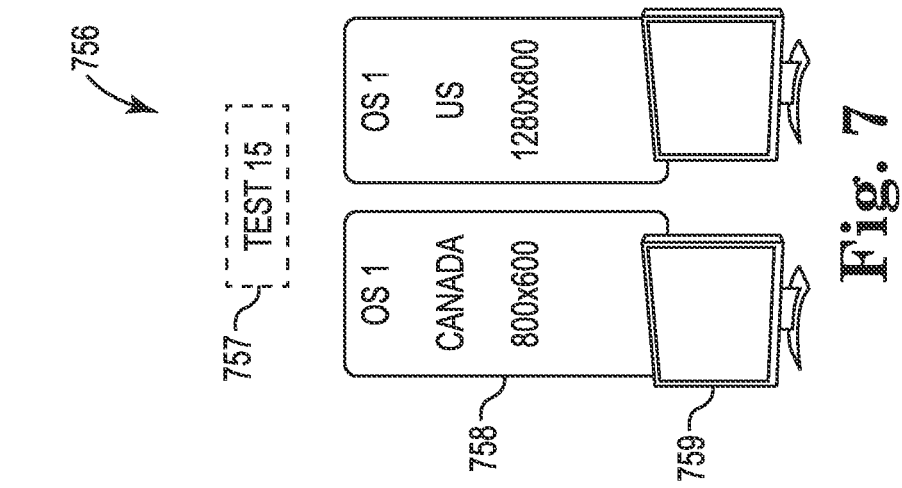
FIG. 7 illustrates an example of generating environments and executing a test according to the present disclosure.

FIG. 7 illustrates an example of generating environments and executing a test according to the present disclosure. To execute a test of an assigned test set, a client environment 756 can be generated. The client environment 756 can be generated to simulate, for example, what is displayed to a user and/or is accessible through the UI as affected by the selection of the options for the configuration parameters as a particular configuration.

For example, Test 15 at 757 of a test set can be executed on particular configurations at 758 (e.g., OS 1/Canada/800× 600 and OS 1/US/1280×800, as described with regard to FIG. 6). As described herein, the combinations of options for locale and resolution (e.g., Canada/800×600 and US/1280× 800) can originate from the three options for combinations of locale and resolution 434 for each operating system 422 described with regard to the reduced coverage matrix 430 in FIG. 4.

The particular configurations 758 can be implemented on individual physical computing devices and/or on virtual machines 759 (e.g., created as a simulated plurality of computing devices within a physical computing device). As described herein, the virtual machines can be accessed and/or utilized through the cloud. For example, a client environment can be generated by provisioning an infrastructure to enable operability of a UI (e.g., enabling a number of virtual machines interacting with a particular operating system) and deploying further applications to effectuate various functionalities (e.g., browsers, databases, etc.) For example, as illustrated in FIG. 7, coding (e.g., software) sufficient to enable each configuration parameter option of the configurations 758 is operably accessible to each client environment 756 (e.g., each virtual machine 759 accessible through the cloud).

Figure 8:
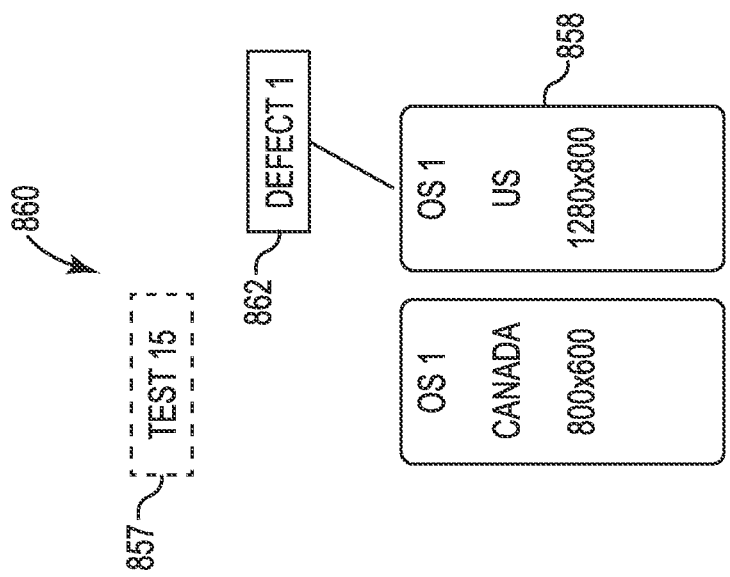
FIG. 8 illustrates an example of recording a defect according to the present disclosure.

FIG. 8 illustrates an example of recording a defect according to the present disclosure. Recording a defect 860 determined by execution of a particular test from a test set (e.g., Test 15 at 857) can be performed by attaching (e.g., automatically in a data format) an indicator of the defect 862 (e.g., Defect 1) to the particular configuration 858 (e.g., OS 1/US/1280×800, as described with regard to FIGS. 6-7) in the client environment. The indicator of the defect 862 can remain attached to the particular configuration 858, for example. In some examples, the indicator of the defect 862 can be removed when the defect has been corrected.

Figure 9:
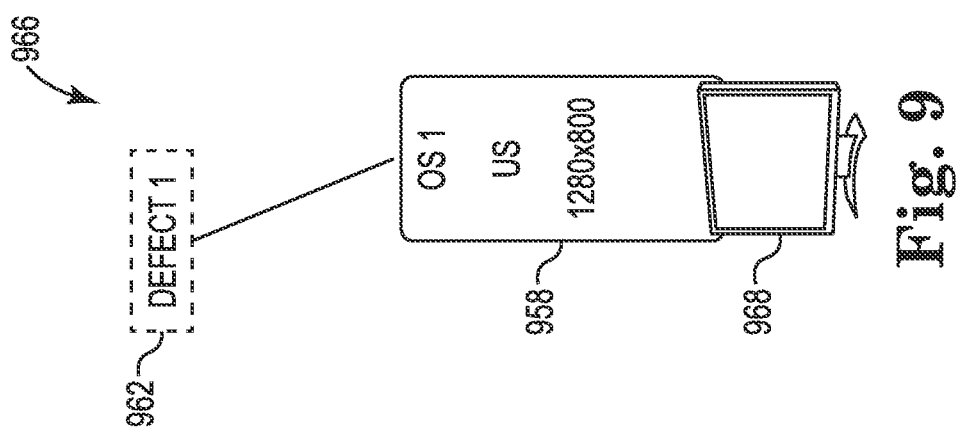
FIG. 9 illustrates an example of reproducing a defect according to the present disclosure.

FIG. 9 illustrates an example of reproducing a defect according to the present disclosure. A defect determined by execution of a particular test from a test set (e.g., Test 15 at 857 in FIG. 8) can be posted 966. For example, a client environment 968 (e.g., in a virtual machine) can be utilized (e.g., which can be the same client environments 436 and/or 759 described with regard to FIGS. 4 and 7) in which an indicator of a defect 962 (e.g., a reproduction of the indicator of the defect 862 described with regard to FIG. 8) can be posted 966 as an attachment to a particular configuration 958 (e.g., configuration OS 1/US/1280×800, as described with regard to FIGS. 6-8). Alternatively or in addition, a defect can be determined by exploratory testing of the UI (e.g., by the UI developer, the BA, the PM, the QA engineer, and/or automatically, among others) without programmed execution of predetermined tests from a test set. Defects determined by such exploratory testing also can be posted 966 to the client environment 968.

In some examples, the client environment 968 can be generated in the cloud and the indicator of the defect 962 of the particular configuration 958 can be posted 966 (e.g., to a central defect repository in ALM that is accessible by the cloud). Posting of the indicator of the defect 962 can, for example, be a recordation of a defect concerning functionality of a UI having been determined by execution of a particular test to a particular configuration, as described herein.

The recordation of the defect can, for example, function as a notification of the defect to a UI developer and/or a code fix application. The notification of the defect can, in some examples, prompt repair of the defect (e.g., correction of software code contributing to the defect). The defect can be repaired, for example, by the UI developer and/or an automated code fix application deploying a code fix to repair a defect in relevant code of the UI. Deployment and/or performance of the code fix can, in some example, be performed through and/or by a number of applications in the cloud that are connected to and/or are part of the client environment 968. In some examples, a QA engineer can detect and/or post the defect and, after the defect is repaired by the UI developer and/or the automated code fix application, verify success of the repair.

FIG. 10 illustrates an example of arranging a display of UI coverage by operating system in a representation of the parameters of the UI configurations according to the present disclosure. A display of UI coverage 1070 can be structurally arranged (e.g., in a hierarchical tree), for example, with operating system 1022 configuration parameter options (e.g., OS1, OS 2, and OS 3) being the base of arrangement of the configuration parameters of the UI configurations. For example, the operating system 1022 configuration options (e.g., OS1, OS 2, and OS 3) can be presented as the base and three options for combinations of locale and resolution 1034 for each operating system 1022, as described with regard to the reduced coverage matrix 430 in FIG. 4, can be presented as dependent branches.

Such a structural arrangement can be utilized, for example, to present a number of defects determined by testing of various configurations, as described herein. For example, one (1) defect 1062 determined during testing of the OS 1/US/1280×800 configuration, as described with regard to FIGS. 6-9, can be shown in the display of UI coverage 1070. In various examples, a plurality of such defects (e.g., defects for a plurality of configurations and/or a plurality of defects for particular configurations) can be shown in the display of UI coverage 1070. In various examples, thresholds can be applied to the number of defects determined by testing and/or shown in the display of UI coverage 1070 to determine coverage of the UI. That is, for a particular UI to be considered covered (e.g., supported) defect thresholds can be applied.

In some examples, defect levels can be determined based upon a level (e.g., criticality) of an effect of the defect on appearance and/or functionality of the UI. As such, defect levels can be included in application of the thresholds. In order for a particular configuration to be considered covered (e.g., supported) by a UI, thresholds for a number of defects determined during testing of the configuration can be applied. An example of such thresholds can be: no high level defects; a maximum of 100 medium level defects; and/or a maximum of 200 low level defects; among other such thresholds. In some examples, a configuration can be considered covered by a UI when the number of defects is equal to or less than one or more of the thresholds.

FIG. 11 illustrates an example of arranging a display of UI coverage by resolution in a representation of the parameters of the UI configurations according to the present disclosure. A display of UI coverage 1171 can be structurally arranged (e.g., in a hierarchical tree), for example, with resolution 1126 configuration options (e.g., 1280×800 and 800×600) being the base of arrangement of the parameters of the UI configurations. For example, each of the operating system 1122 configuration options (e.g., OS1, OS 2, and OS 3) can be presented for each of the resolution 1126 configuration options at the base and three locale 1124 configuration options (e.g., Japan, Canada, and US) can be presented for each of the operating system 1122 configuration options.

In various examples, the resolution 1126 configuration options and the locale 1124 configuration options can be considered and/or presented separately from the combinations of locale and resolution (e.g., as described at 434 with regard to the reduced coverage matrix 430 in FIG. 4). For example, in some examples of the present disclosure, the locale and the resolution are not the configuration parameters that are the independent parameters being combined in the reduced coverage matrix. Regardless, configuration parameter data contributing to the initial coverage matrix (e.g., as described with regard to FIG. 3) is available for analysis and/or display irrespective of whether such data has been combined with other configuration parameter data determined to be independent (e.g., for the reduced coverage matrix described with regard to FIG. 4).

In a display such as shown in FIG. 11, for example, the configuration parameters and/or options thereof can include markers to indicate whether that particular configuration parameter and/or option has been determined to be independent with regard to and/or has been combined with another particular configuration parameter and/or option. Such markers can also indicate whether results of defect testing utilizing such combinations are available (e.g., the three options for combinations of locale and resolution 1034, as described with regard to FIG. 10).

In various examples, a display of UI coverage can have more than the two or three levels of the hierarchical trees shown in FIGS. 10 and 11. That is, various other configuration parameters (e.g., operating system, browser, language, locale, and/or resolution, among others) can be included, either separately or by combining at least two independent UI configuration parameters, as described herein. In addition, any of the configuration parameters (e.g., operating system, browser, language, locale, and/or resolution, among others) can be selected (e.g., by the UI developer, the BA, the PM, the QA engineer, and/or automatically, among others) as the base of the hierarchy and/or for any level in the hierarchy.

Such a structural arrangement can be utilized, for example, to present a number of tests performed in the testing of each of the various configurations, as described herein. For example, the 1280×800/OS 1/US configuration is shown at 1172 to have been used in one out of one (1/1) of the predetermined tests in an appropriate test set, whereas the 1280×800/OS 3/Canada configuration is shown at 1173 to have not been tested. Such indicators of how many tests have been performed can be saved and/or presented for each of, or a subset of, the configurations in a display 1171 of UI coverage.

Moreover, a display of defects for configurations is presented in FIG. 10 and a display of test performance on configurations is separately presented in FIG. 11 for purposes of clarity. However, in various examples, such results indicative of UI coverage can be displayed together, in particular when the display of UI coverage for each is similarly structurally arranged, for example, with operating system configuration options or resolution configuration options being the base of arrangement of the parameters of the UI configurations, as shown in FIGS. 10 and 11.

In various examples, thresholds can be applied to the number of tests executed as indicated by a saved total and/or as shown in the display of UI coverage 1171 to determine coverage of the UI. That is, for a particular UI to be considered covered (e.g., supported), test thresholds can be applied. In order for a particular configuration to be considered covered (e.g., supported) by a UI, thresholds for a number of tests executed on the configuration can be applied. Examples of such thresholds can include a minimum of 80% of appropriate tests (e.g., in a number of test sets) being executed on a configuration, among other such thresholds. In some examples, a configuration can be considered covered by a UI when the number of tests executed is equal to or more than one or more of the thresholds.

In some examples, determination of defects (e.g., as described with regard to FIGS. 6-10) can be combined with a determination of the number of tests executed. A threshold of such a combination can, for example, be: a minimum of 80% of appropriate tests being executed and a minimum of 80% of the executed tests determining no high level defects; a minimum of 80% of the executed tests determining a maximum of 100 medium level defects; and/or a minimum of 80% of the executed tests determining a maximum of 200 low level defects; among other such thresholds.

Satisfying such thresholds can determine whether a configuration can be considered covered by a UI. For example, showing at 1172 in FIG. 11 that the 1280×800/OS 1/US configuration has been used in (1/1) of the predetermined tests in an appropriate test set would satisfy a threshold of a minimum of 80% of appropriate tests (e.g., in a number of test sets) being executed because 100% of the predetermined tests in the appropriate test set were executed. In contrast, showing at 1173 that the 1280×800/OS 3/Canada configuration has not been tested would not satisfy such a threshold whether or not there are predetermined tests in an appropriate test set to actually be executed on the configuration.

In the following flow example of determining UI coverage, the actions, functions, calculations, data manipulations and/or storage, etc., are described by way of example and not by way of limitation as being effectuated by existent products. As such, various combinations of Application Lifecycle Management (ALM), Application Lifecycle Intelligence (ALI), Continuous Delivery Automation (CDA), Integrated Development Environment (IDE), Sprinter, and/or Tasktop Connector to ALM applications, among others, can be utilized to effectuate the actions, functions, calculations, data manipulations and/or storage, etc., described herein. However, such actions, functions, calculations, data manipulations and/or storage, and equivalents thereof, can potentially be effectuated using products from other manufacturers and/or providers without departing from the spirit and scope of the present disclosure.

Further, the following flow example is presented in an illustrative and not a restrictive manner. That is, the scope and breadth of the present disclosure are to be interpreted in view of the total content of the Detailed Description and the claims appended thereto and are not to be limited to the specifics of the following flow example.

The flow example can include a definition and assignment of user experience configuration parameters and options (e.g., the various operating systems, browsers, languages, locales, and/or resolutions, among others, described with regard to FIGS. 2 and 3). The flow example can include a selection of supported configurations (e.g., the selecting of supported configuration parameters and options thereof for a UI described with regard to FIGS. 2-4), possible based upon, for example, a cost/benefit analysis of having particular configuration parameters and/or options thereof supported by the UI. For example, a BA can select in an ALM application a set of supported configuration parameters and/or options thereof for a UI release. The BA can see a calculated number of client machines (e.g., computing devices) to cover all the configurations selected.

The BA can determine which configuration parameters are independent (e.g., meaning they are not to be checked in every possible combination). For example, as described with regard to FIG. 3, because they are independent, it is unnecessary to check each possible resolution against each possible locale. As such, locale parameter options and resolution parameter options can be combined to reduce the number of configuration parameters in a reduced coverage matrix, as described with regard to FIG. 4, which can be generated by the system. In some examples, the reduced number of configurations can be determined (e.g., by the BA) to be covered by a particular UI release and the configurations can be split between cycles (e.g., manually and/or using a predefined automatic method), as described with regard to FIG. 5.

Testing can be executed on the given configurations, as described with regard to FIGS. 6-8. For example, a QA engineer can assign particular configurations to one or more test sets. The test sets can, for example, be executed using the Sprinter application. The test sets can be executed, for example, by generating a number of client environments in the cloud, as described with regard to FIG. 7, which can be provisioned and/or deployed, for example, by the CDA application. A plurality of configurations being tested in a corresponding plurality of client environments can be tested (e.g., simultaneously) using a mirroring mode, for example, on some or all the configurations in some or all of the generated environments. Results generated by execution of the tests on the configurations can be sent to and recorded by the ALM application. Based upon such results, indicators of defects can be created, which can be attached to the relevant configurations, as described with regard to FIG. 8.

The indicators of the defects can be reproduced, for example, in the cloud as an attachment to the relevant configuration in a client environment, as described with regard to FIG. 9. The UI developer, the BA, the PM, and/or the QA engineer, for example, can see such indicators of defects, as described with regard to FIGS. 9 and 10. Such information can, for example, be presented by a Tasktop Connector to ALM application, which can be connected to an IDE application. A client environment can be deployed by the CDA application, which can be the same as or different from the client environment previously deployed, and a code fix can be deployed appropriate to repair of the UI code corresponding to the defect. In some examples, the UI developer, the BA, the PM, and/or the QA engineer can connect to the client environment to verify success of the code repair by the code fix.

As described in the present disclosure, UI coverage results can be tracked. For example, a project manager can view a cycle of a UI release and its coverage matrix results in ALM, based on numbers of defects that were determined, the number of tests that were executed, and/or the results of such tests, as described with regard to FIGS. 10 and 11. The project manager, for example, can select configuration parameters (e.g., selecting a configuration parameter as a base for a hierarchical tree representation) and can see the coverage information (e.g., how many defects were determined for a particular configuration parameter and/or how many tests were executed for that configuration parameter or another configuration parameter, among other coverage information). The project manager, for example, can set thresholds in order to determine (e.g., distinguish) problematic configurations and/or a quality level of particular UI encoding (e.g., software).

An element in flows consistent with the present disclosure is determination of independent parameters to reduce the size of the coverage matrix. The BA, for example, can define targets (e.g., configurations including supported configuration parameters and options) for a UI release. Distribution to cycles can clarify what should be covered and when. The generation (e.g., automatically) of the client environments can simplify (e.g., for a QA engineer and/or a UI developer, among others) setting up of client machines, both for testing of configurations and for defect reproduction. Because the process is centered on the configurations to be tested, a project manager, for example, can have documentation of information regarding the coverage and/or quality of the UI in supported configurations, which can contribute to quality of software updates (e.g., language packs, among others). A manufacturer and/or a provider could reduce time, cost, and/or other resources spent on preparation of releases. The visibility of the coverage and/or quality would allow the manufacturer and/or the provider to make better decisions during preparation of the releases.

For example, automatic UI testing can be used in addition to or instead of manual testing. QA teams can use manual UI quality testing and/or tracking (e.g., involving spreadsheets) to define the configurations and manually split them between QA engineers. However, documentation of the manual UI quality testing and/or tracking may not be automatically reflected in a central repository of the executed tests and/or determined defects.

The systems, machine readable media, and methods described herein provide a way to improve the process of developing and testing UIs. Hardware and software components that manufacturers and/or providers may already have (e.g., application lifecycle management packages) can be integrated with an application (e.g., the CDA application) to provision and/or deploy testing machines (e.g., client environments) in the cloud to define, execute, and/or track UI testing and/or quality.

The systems, machine readable media, and methods described herein can also be applied to testing of parameters that are not directly related to UIs. For example, if a product is intended to support multiple databases (e.g., both Oracle® and SQL® databases, among others), a configuration parameter option can be defined for each, which can be included in the coverage matrix. Selections can be made as to which databases should be tested and when, environments can be provisioned and deployed automatically that include the database servers, and/or the testing results (e.g., defects) can be automatically recorded to track the quality, etc. Integration with an application lifecycle intelligence system (e.g., the ALI application), can contribute to documenting such information and answering questions concerning which configurations of the databases and other configuration parameter options are covered in a specific application build.

The systems, machine readable media, and methods described herein enable, for example, use of the cloud for automatic provision and deployment of testing machines (e.g., client environments) to increase testing and development efficiency. A central ALM system can, for example, define a coverage matrix, reduce it by selecting independent configuration parameters, split configurations between cycles, automatically generate client environments, and/or track the coverage and/or quality. Hence, the systems, machine readable media, and methods described herein enable answering questions about whether a particular configuration covered and/or about the quality of a product (e.g., a UI) in the particular configuration, among others.

Figure 12:
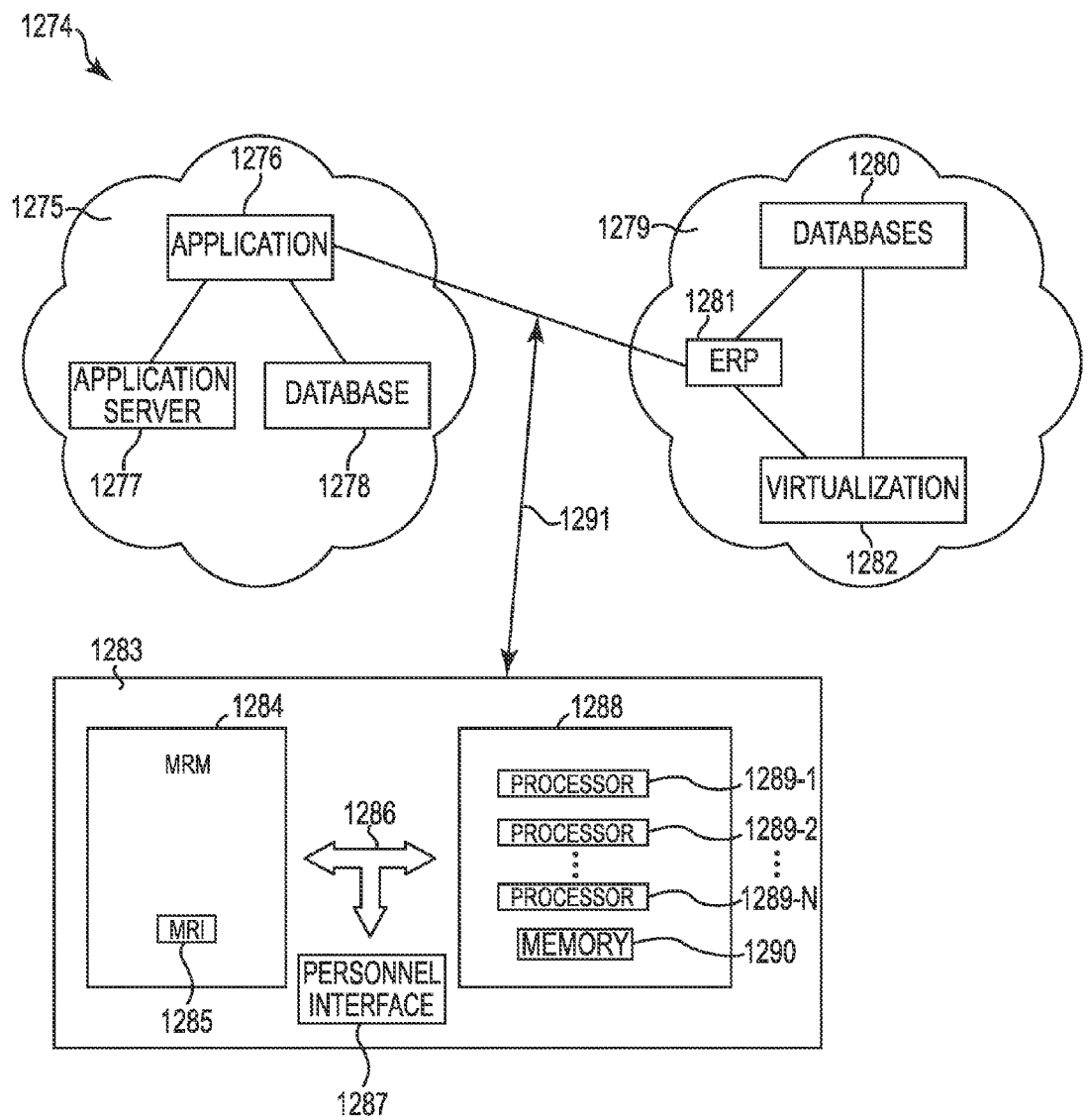
FIG. 12 illustrates a block diagram of an example system for UI coverage according to the present disclosure.

FIG. 12 illustrates a block diagram of an example system for determining UI coverage according to the present disclosure. An example system for determining UI coverage is described below as being implemented in the cloud by way of example and not by way of limitation. That is, in some examples of the present disclosure, determining UI coverage can be performed (e.g., at least partially) within an organization utilizing applications, as described herein, accessible and usable through wired communication connections in addition or as an alternative to through wireless communications.

In some examples, the system 1274 illustrated in FIG. 12 can include a number of cloud systems. In some examples, the number of clouds can include a public cloud system 1275 and a private cloud system 1279. For example, an environment (e.g., an information technology (IT) environment for the UI developer, the BA, the PM, and/or the QA engineer, among others) can include a public cloud system 1275 and a private cloud system 1279 that can include a hybrid environment and/or a hybrid cloud. A hybrid cloud, for example, can include a mix of physical server systems and dynamic cloud services (e.g., a number cloud servers). For example, a hybrid cloud can involve interdependencies between physically and logically separated services consisting of multiple systems. A hybrid cloud, for example, can include a number of clouds (e.g., two clouds) that can remain unique entities but that can be bound together.

The public cloud system 1275, for example, can include a number of applications 1276 (e.g., selected from a number of ALMs, ALIs, CDAs, IDEs, Sprinters, and/or Tasktop Connectors, among others), an application server 1277, and a database 1278. The public cloud system 1275 can include a service provider (e.g., the application server 1277) that makes a number of the applications 1276 and/or resources (e.g., the database 1278) available (e.g., to personnel such as the UI developer, the BA, the PM, and/or the QA engineer, among others) over the Internet, for example. The public cloud system 1275 can be free or offered for a fee. For example, the number of applications 1276 can include a number of resources available to the public over the Internet. Personnel can access a cloud-based application through a number of personnel interfaces 1287 (e.g., via an Internet browser). An application server 1277 in the public cloud system 1275 can include a number of virtual machines (e.g., client environments) to enable determination of UI coverage, as described herein. The database 1278 in the public cloud system 1275 can include a number of databases that operate on a cloud computing platform.

The private cloud system 1279 can, for example, include an Enterprise Resource Planning (ERP) system 1281, a number of databases 1280, and virtualization 1282 (e.g., a number of virtual machines, such as client environments, to enable determination of UI coverage, as described herein). For example, the private cloud system 1279 can include a computing architecture that provides hosted services to a limited number of nodes (e.g., computers and/or virtual machines thereon) behind a firewall. The ERP 1281, for example, can integrate internal and external information across an entire business unit and/or organization (e.g., of a UI developer). The number of databases 1280 can include an event database, an event archive, a central configuration management database (CMDB), a performance metric database, and/or databases for a number of ALM, ALI, CDA, IDE, Sprinter, and/or Tasktop Connector applications, among other databases. Virtualization 1282 can, for example, include the creation of a number of virtual resources, such as a hardware platform, an operating system, a storage device, and/or a network resource, among others.

In some examples, the private cloud system 1279 can include a number of applications (e.g., selected from a number of ALM, ALI, CDA, IDE, Sprinter, and/or Tasktop Connector applications, among others) and an application server as described for the public cloud system 1275. In some examples, the private cloud system 1279 can similarly include a service provider that makes a number of the applications and/or resources (e.g., the databases 1280 and/or the virtualization 1282) available for free or for a fee (e.g., to personnel such as the UI developer, the BA, the PM, and/or the QA engineer, among others) over, for example, a local area network (LAN), a wide area network (WAN), a personal area network (PAN), and/or the Internet, among others. The public cloud system 1275 and the private cloud system 1279 can be bound together, for example, through one or more of the number of applications (e.g., 1276 in the public cloud system 1275) and/or the ERP 1281 in the private cloud system 1279 to enable determination of UI coverage, as described herein.

The system 1274 can include a number of computing devices 1283 (e.g., a number of IT computing devices, system computing devices, and/or manufacturing computing devices, among others) having machine readable memory (MRM) resources 1284 and processing resources 1288 with machine readable instructions (MRI) 1285 (e.g., computer readable instructions) stored in the MRM 1284 and executed by the processing resources 1288 to, for example, enable determination of UI coverage, as described herein. The computing devices 1283 can be any combination of hardware and/or program instructions (e.g., MRI) configured to, for example, enable the determination of UI coverage, as described herein. The hardware, for example, can include a number of personnel interfaces 1287 (e.g., GUIs) and/or a number of processing resources 1288 (e.g., processors 1289-1, 1289-2, . . . , 1289-N), the MRM 1284, etc. The processing resources 1288 can include memory resources 1290 and the processing resources 1288 (e.g., processors 1289-1, 1289-2, . . . , 1289-N) can be coupled to the memory resources 1290. The MRI 1285 can include instructions stored on the MRM 1284 that are executable by the processing resources 1288 to execute one or more of the various actions, functions, calculations, data manipulations and/or storage, etc., as described herein.

The computing devices 1283 can include the MRM 1284 in communication through a communication path 1286 with the processing resources 1288. For example, the MRM 1284 can be in communication through a number of application servers (e.g., Java® application servers) with the processing resources 1288. The computing devices 1283 can be in communication with a number of tangible non-transitory MRMs 1284 storing a set of MRI 1285 executable by one or more of the processors (e.g., processors 1289-1, 1289-2, . . . , 1289-N) of the processing resources 1288. The MRI 1285 can also be stored in remote memory managed by a server and/or can represent an installation package that can be downloaded, installed, and executed. The MRI 1285, for example, can include a number of modules as described with regard to FIG. 13.

Processing resources 1288 can execute MRI 1285 that can be stored on an internal or external non-transitory MRM 1284. The non-transitory MRM 1284 can be integral, or communicatively coupled, to the computing devices 1283, in a wired and/or a wireless manner. For example, the non-transitory MRM 1284 can be internal memory, portable memory, portable disks, and/or memory associated with another computing resource. A non-transitory MRM (e.g., MRM 1284), as described herein, can include volatile and/or non-volatile storage (e.g., memory). The processing resources 1288 can execute MRI 1285 to perform the actions, functions, calculations, data manipulations and/or storage, etc., as described herein. For example, the processing resources 1288 can execute MRI 1285 to enable determination of UI coverage, as described herein.

The MRM 1284 can be in communication with the processing resources 1288 via the communication path 1286. The communication path 1286 can be local or remote to a machine (e.g., computing devices 1283) associated with the processing resources 1288. Examples of a local communication path 1286 can include an electronic bus internal to a machine (e.g., a computer) where the MRM 1284 is volatile, non-volatile, fixed, and/or removable storage medium in communication with the processing resources 1288 via the electronic bus. Examples of such electronic buses can include Industry Standard Architecture (ISA), Peripheral Component Interconnect (PCI), Advanced Technology Attachment (ATA), Small Computer System interface (SCSI), Universal Serial Bus (USB), among other types of electronic buses and variants thereof.

The communication path 1286 can be such that the MRM 1284 can be remote from the processing resources 1288, such as in a network connection between the MRM 1284 and the processing resources 1288. That is, the communication path 1286 can be a number of network connections. Examples of such network connections can include LAN, WAN, PAN, and/or the Internet, among others. In such examples, the MRM 1284 can be associated with a first computing device and the processing resources 1288 can be associated with a second computing device (e.g., computing devices 1283). For example, such an environment can include a public cloud system (e.g., 1275) and/or a private cloud system (e.g., 1279) to enable determination of UI coverage, as described herein.

In various examples, the processing resources 1288, the memory resources 1284 and/or 1290, the communication path 1286, and/or the personnel interfaces 1287 associated with the computing devices 1283 can have a connection 1291 (e.g., wired and/or wirelessly) to a public cloud system (e.g., 1275) and/or a private cloud system (e.g., 1279). The connection 1291 can, for example, enable the computing devices 1283 to directly and/or indirectly control (e.g., via the MRI 1285 stored on the MRM 1284 executed by the processing resources 1288) functionality of a number of the applications 1276 (e.g., selected from the number of ALM, ALI, CDA, IDE, Sprinter, and/or Tasktop Connector applications, among others) accessible in the cloud. The connection 1291 also can, for example, enable the computing devices 1283 to directly and/or indirectly receive input from the number of the applications 1276 accessible in the cloud.

In various examples, the processing resources 1288 coupled to the memory resources 1284 and/or 1290 can execute MRI 1285 to enable the computing devices 1283 to reduce a number of cells of a matrix by combination of at least two independent UI configuration parameters to determine a reduced number of UI configurations to test (e.g., as described with regard to FIG. 4), create a plurality of environments (e.g., client environments) to test the reduced number of UI configurations of the matrix (e.g., as described with regard to FIGS. 6-9), execute a number of predetermined tests, where test results depend on input of the reduced number of UI configurations of the matrix (e.g., as described with regard to FIGS. 6-9), and track test results for each of the reduced number of UI configurations of the matrix to determine the UI coverage (e.g., as described with regard to FIGS. 10 and 11). As described herein, the UI configuration parameters can include operating system, browser, language, locale, and/or resolution, among others. A combination of a plurality of the UI configuration parameters, at least one of which has a plurality of options, is initially utilized to populate the cells of the matrix, the number of cells of which can be reduced by the combination of at least two independent UI configuration parameters.

In various examples, the processing resources 1288 coupled to the memory resources 1284 and/or 1290 can execute MRI 1285 to enable the computing devices 1283 to execute the number of predetermined tests on a number of applications (e.g., selected from a number of ALMs, ALIs, CDAs, IDEs, Sprinters, and/or Tasktop Connectors, among others) in combination with the reduced number of UI configurations of the matrix. In various examples, the processing resources 1288 coupled to the memory resources 1284 and/or 1290 can execute MRI 1285 to enable the computing devices 1283 to execute the number of predetermined tests on the number of applications in mirroring mode in the plurality of environments.

Figure 13:
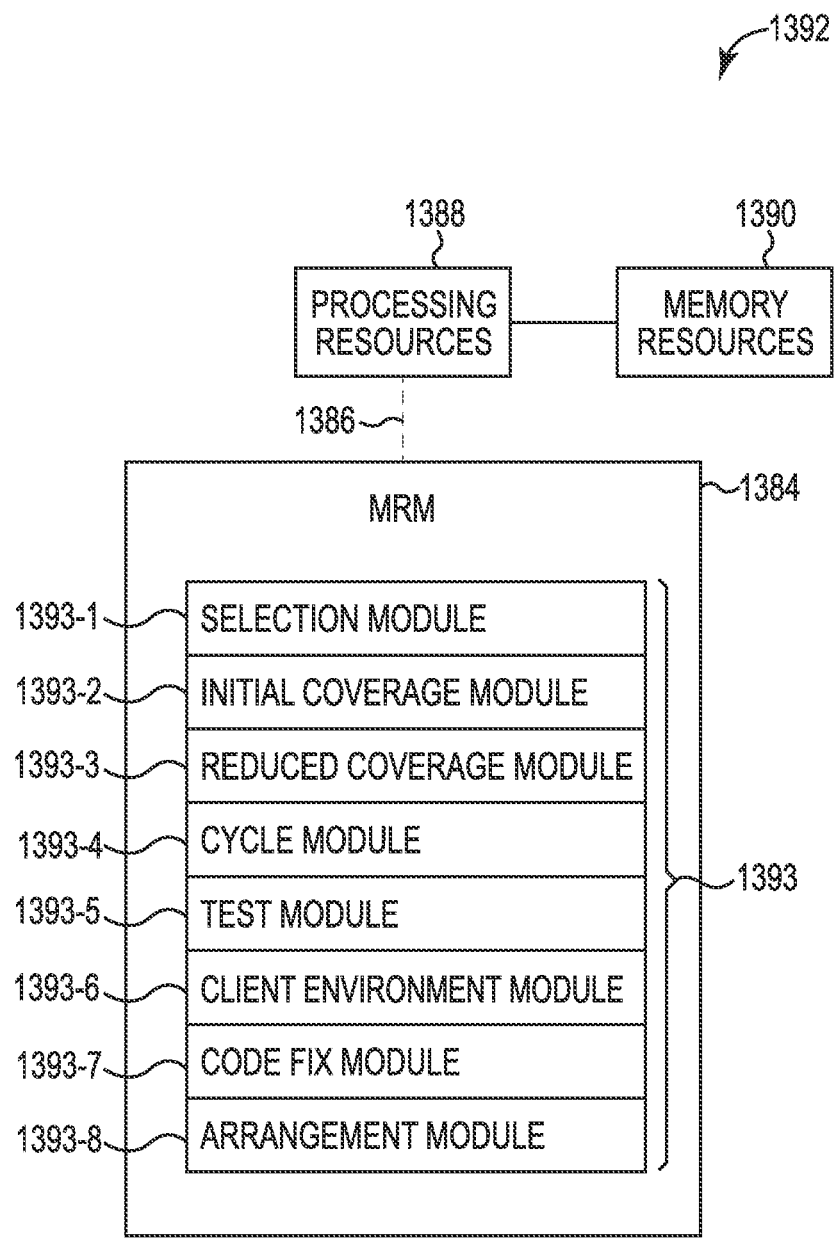
FIG. 13 illustrates a diagram of an example computing system for UI coverage according to the present disclosure.

FIG. 13 illustrates a diagram of an example computing system for UI coverage according to the present disclosure. The computing system 1392 can utilize software, hardware, firmware, and/or logic for determining UI coverage, as described herein. The computing system 1392 can be any combination of hardware and program instructions. The hardware, for example, can include a number of memory resources 1390, processing resources 1388, MRM 1384, databases, among other components. The computing system 1392 can include the memory resources 1390, and the processing resources 1388 can be coupled to the memory resources 1390. Program instructions 1393 (e.g., MRI 1285) can include instructions stored on the MRM 1384 and executable by the processing resources 1388 to perform the actions, functions, calculations, data manipulations and/or storage, etc., as described herein. The MRM 1384 can be in communication with the processing resources 1388 via a communication path 1386.

MRM 1384 can be in communication with a number of processing resources of more or fewer than processing resources 1388. The processing resources 1388 can be in communication with a tangible non-transitory MRM 1384 storing a set of MRI 1393 executable by the processing resources 1388, as described herein. The MRI 1393 can also be stored in remote memory managed by a server (e.g., in the cloud) and/or can represent an installation package that can be downloaded, installed, and executed.

The processing resources 1388 can execute MRI 1393 that can be stored on an internal and/or external non-transitory MRM 1384 (e.g., in the cloud). The processing resources 1388 can execute the MRI 1393 to perform the various the actions, functions, calculations, data manipulations and/or storage, etc., as described herein. The MRI 1393 can include a number of modules (e.g., 1393-1, 1393-2, 1393-3, 1393-4, 1393-5, 1393-6, 1393-7, and 1393-8, among others). The number of modules can include MRI that when executed by the processing resources 1388 can perform the various the actions, functions, calculations, data manipulations and/or storage, etc., as described herein.

The number of modules can be sub-modules of other modules. For example, the selection module 1393-1, the initial coverage module 1393-2, and/or the reduced coverage module 1393-3 can be sub-modules and/or can be contained within the same computing device (e.g., computing device 1392). In another example, the number of modules can comprise individual modules on separate and distinct computing devices (e.g., in the cloud).

A selection module 1393-1 can include MRI that when executed by the processing resources 1388 can perform a number of selection functions. The selection module 1393-1 can include instructions that when executed enable, for example, selection of configuration parameters and/or options thereof, as described with regard to FIG. 2.

An initial coverage module 1393-2 can include MRI that when executed by the processing resources 1388 can perform a number of functions related to populating cells of the initial coverage matrix, as described with regard to FIG. 3. The initial coverage module 1393-2 can include instructions that when executed enable, for example, populating the cells of the initial coverage matrix with the selections of the configuration parameters and/or options thereof enabled via selection module 1393-1. The initial coverage module 1393-2 also can include instructions that when executed enable, for example, storage of the selections and/or the initial coverage matrix.

A reduced coverage module 1393-3 can include MRI that when executed by the processing resources 1388 can perform a number of functions related to reducing the number of cells in the reduced coverage matrix, as described with regard to FIG. 4. The reduced coverage module 1393-3 can include instructions that when executed enable, for example, reducing the number cells in the reduced coverage matrix by combining independent configuration parameters. The reduced coverage module 1393-3 also can include instructions that when executed enable, for example, storage of which configuration parameters have been determined to be independent and/or have been or can be combined and/or storage of the reduced coverage matrix.

A cycle module 1393-4 can include MRI that when executed by the processing resources 1388 can perform a number of functions related to constructing the various cycles, as described with regard to FIG. 5. The reduced coverage module 1393-4 can include instructions that when executed enable, for example, splitting various configuration parameters and options thereof between cycles and distributing the various configuration parameters and options to the cycles. The reduced coverage module 1393-4 also can include instructions that when executed enable, for example, storage of which configuration parameters and options thereof have been split between and/or distributed to the cycles.

A test module 1393-5 can include MRI that when executed by the processing resources 1388 can perform a number of functions related to testing the various configurations to determine UI coverage, as described with regard to FIGS. 6-9. The test module 1393-5 can include instructions that when executed enable, for example, assigning configurations to a test set (e.g., which configurations can be assigned to test sets within the cycles). The test module 1393-5 also can include instructions that when executed enable, for example, a configuration to have various UI functions tested by application of (e.g., automatically) a number of appropriate and predetermined tests. The number of tests can be designed to test functionality of various pathways and/or subsystems of the UIs and/or appropriate functionality of downstream system applications accessed through the UI configurations, among other testable UI determinations, and/or to attach an indicator of issues revealed by results of testing such functionalities, which can, as described herein, be labeled as defects. The test module 1393-5 also can include instructions that when executed enable, for example, storage of which configuration parameters and/or options thereof have been tested and/or which have been determined to have defects.

A client environment module 1393-6 can include MRI that when executed by the processing resources 1388 can perform a number of functions related to generating client environments and executing tests therein, as described with regard to FIGS. 7-9. The client environment module 1393-6 can include instructions that when executed enable, for example, client environments to be generated by provisioning an infrastructure to enable operability of a UI (e.g., enabling a virtual machine interacting with a particular operating system) and deploying further applications to effectuate various functionalities (e.g., browsers, databases, etc.). The client environment module 1393-6 also can include instructions that when executed enable, for example, implementing coding sufficient to enable each configuration parameter option of the configurations to be operably accessible to each client environment (e.g., each virtual machine accessible through the cloud). The client environment module 1393-6 also can include instructions that when executed enable, for example, a plurality of configurations being tested in a corresponding plurality of client environments to be tested (e.g., simultaneously) using a mirroring mode, for example, on some or all the configurations in some or all of the generated environments. The client environment module 1393-6 also can include instructions that when executed enable, for example, recording a defect determined by execution of a particular test from a test set (e.g., by attaching an indicator of the defect to the particular configuration) and/or posting of the defect, as described with regard to FIGS. 8-9. The client environment module 1393-6 also can include instructions that when executed enable, for example, the client environment to be generated in the cloud and the indicator of the defect of the particular configuration to be posted (e.g., to a central defect repository in ALM that is accessible by the cloud). The client environment module 1393-6 also can include instructions that when executed enable, for example, integration in the cloud with a number of applications (e.g., selected from a number of ALMs, ALIs, CDAs, IDEs, Sprinters, and/or Tasktop Connectors, among others) through an application server. The client environment module 1393-6 also can include instructions that when executed enable, for example, storage of each of the actions, functions, calculations, and/or data manipulations just described.

A code fix module 1393-7 can include MRI that when executed by the processing resources 1388 can perform a number of functions related to deploying a code fix appropriate to repair of the UI code corresponding to a particular defect. The code fix module 1393-7 can include instructions that when executed enable, for example, results of the code fix to be supplied to, for example, the client environment module 1393-6 such that the UI developer, the BA, the PM, and/or the QA engineer can connect to the client environment to verify success of the code repair by the code fix. The code fix module 1393-7 also can include instructions that when executed enable, for example, storage of the code fixes that have been selected and/or executed on particular defects of configuration parameters and/or options thereof and/or the results of deployment thereof.

An arrangement module 1393-8 can include MRI that when executed by the processing resources 1388 can perform a number of functions related to a display of defects for configurations, as described with regard to FIG. 10, and/or a display of test performance (e.g., how many and/or which tests have been executed on configurations), as described with regard to FIG. 11. The arrangement module 1393-8 can include instructions that when executed enable, for example, display of UI coverage that is structurally arranged (e.g., in a hierarchical tree), for example, with a particular configuration parameter being the base of the arrangement of the parameters of the UI configurations and other configuration parameters (e.g., including the combined independent configuration parameters) being presented in other positions (e.g., layers) in the structural arrangement.

The arrangement module 1393-8 can include instructions that when executed enable, for example, determination and/or application of a number of thresholds to the defects for configurations and/or test performance on the configurations to determine whether a configuration can be considered covered (e.g., supported) by a UI. The arrangement module 1393-8 can include instructions that when executed enable, for example, the displays of the arrangements, the test results and/or test performance associated therewith, and/or indicators of whether a configuration, configuration parameter, and/or options thereof are covered by a particular UI (e.g., based upon application of the thresholds) to be displayed to, for example, UI developer, the BA, the PM, and/or the QA engineer. The arrangement module 1393-8 also can include instructions that when executed enable, for example, storage of the displays and/or determinations of threshold coverage just described.

In various examples, any of the MRI 1393 included in the number of modules (e.g., 1393-1, 1393-2, 1393-3, 1393-4, 1393-5, 1393-6, 1393-7, and 1393-8, among others) can be stored (e.g., in software, firmware, and/or hardware) individually and/or redundantly in the same and/or separate locations. Separately stored MRI 1393 can be functionally interfaced (e.g., accessible through the public/private cloud described with regard to FIG. 12). For example, the client environment module 1393-6 may be stored and/or executed by a Sprinter and/or an ALM application in one computing system and the code fix module 1393-7 may be stored and/or executed by an ALM application in another computing system, among many other examples.

In various examples, the processing resources 1388 coupled to the memory resources 1384 and/or 1390 can execute MRI 1393 to enable the computing system 1392 to reduce a number of cells of a matrix by combination of at least two independent UI configuration parameters to, in various examples, determine a reduced number of UI configurations. The computing system 1392 can, in various examples, assign a number of the reduced number of UI configurations to a predetermined test set, where the test set can include a plurality of predetermined tests. The computing system 1392 can create a plurality of environments (e.g., client environments) in the cloud to test the assigned number of UI configurations and execute the predetermined test set in the cloud on the assigned number of UI configurations. The computing system 1392 can track test results for each of the assigned number of UI configurations of the matrix to determine the UI coverage.

In some examples, the plurality of environments in the cloud can be the same number as the assigned number of UI configurations to be tested (e.g., there is a client configuration created in the cloud for each UI configuration to be tested). In some examples, the computing system 1392 can record a defect of a UI based upon input of the assigned number of UI configurations. In some examples, the computing system 1392 can reproduce the defect in an environment in the cloud and deploy a code fix to relevant code of the defect. In some examples, each of the reduced number of UI configurations can be assigned to one or more test sets such that coverage of all the reduced number of UI configurations can be determined. In some examples, the computing system 1392 can structure a number of graphic representations of the test results based upon hierarchical representation of the parameters of the UI configurations.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processing resource.

As described herein, plurality of storage volumes can include volatile and/or non-volatile storage (e.g., memory). Volatile storage can include storage that depends upon power to store information, such as various types of dynamic random access memory (DRAM), among others. Non-volatile storage can include storage that does not depend upon power to store information. Examples of non-volatile storage can include solid state media such as flash memory, electrically erasable programmable read-only memory (EEPROM), phase change random access memory (PCRAM), magnetic storage such as a hard disk, tape drives, floppy disk, and/or tape storage, optical discs, digital versatile discs (DVD), Blu-ray discs (BD), compact discs (CD), and/or a solid state drive (SSD), etc., as well as other types of machine readable media.

It is to be understood that the descriptions presented herein have been made in an illustrative manner and not a restrictive manner. Although specific examples systems, machine readable media, methods and instructions, for example, for determining UI coverage have been illustrated and described herein, other equivalent component arrangements, instructions, and/or device logic can be substituted for the specific examples presented herein without departing from the spirit and scope of the present disclosure.

The specification examples provide a description of the application and use of the systems, machine readable media, methods, and instructions of the present disclosure. Since many examples can be formulated without departing from the spirit and scope of the systems, machine readable media, methods, and instructions described in the present disclosure, this specification sets forth some of the many possible example configurations and implementations.

What is claimed:

1. A method for determining user interface (UI) coverage, comprising:
   utilizing a computing resource with a number of personnel interfaces for:
   populating cells of a matrix with a plurality of UI configuration parameters to determine a total number of testable UI configurations, including;
   splitting the plurality of UI configuration parameters into development and QA cycles that are based on a project timeline; and
   assigning a first subset of the plurality of UI configuration parameters a lower testing frequency as compared to a second subset of the plurality of UI configuration parameters based on the development and QA cycles, wherein a configuration parameter option in the first subset is less utilized with a particular UI as compared to a configuration parameter option in the second subset;
   reducing a number of the cells of the matrix by combining at least two independent UI configuration parameters within the plurality of UI configuration parameters to determine a reduced number of UI configurations to test;
   executing a number of predetermined tests, wherein test results depend on input of the reduced number of UI configurations and the assignments;
   attaching at least one of a plurality of indicators based upon a criticality level of a detected defect of a particular UI configuration on at least one of an appearance and a functionality of the particular UI configuration; and
   determining the UI coverage based upon the test results.

2. The method of claim 1, comprising executing the number of predetermined tests on an application displayable on a number of graphical user interfaces.

3. The method of claim 1, comprising determining the UI coverage by determining a number of predetermined tests to be executed on each of the reduced number of UI configurations.

4. The method of claim 1, comprising determining the UI coverage by determining a number of defects for each of the reduced number of UI configurations based upon the test results.

5. The method of claim 1, comprising executing a number of predetermined test sets, wherein each of the test sets comprises a plurality of tests.

6. A non-transitory machine readable medium storing a set of instructions executable by a processor to cause a computer to:
split a plurality of user interface (UI) configuration parameters into development and QA cycles that are based on a project timeline; and
assign a first subset of the plurality of UI configuration parameters a lower testing frequency as compared to a second subset of the plurality of UI configuration parameters based on the development and QA cycles, wherein a configuration parameter option in the first subset is less utilized with a particular UI as compared to a configuration parameter option in the second subset;
reduce a number of cells of a matrix by combination of at least two UI configuration parameters within the plurality of UI configuration parameters to determine a reduced number of UI configurations to test;
create a plurality of environments to test the reduced number of UI configurations of the matrix;
execute a number of predetermined tests, wherein test results depend on input of the reduced number of UI configurations of the matrix and the assignments;
attach at least one of a plurality of indicators based upon a criticality level of a detected defect of a particular UI configuration on at least one of an appearance and a functionality of the particular UI configuration; and
track test results for each of the reduced number of UI configurations of the matrix to determine the UI coverage.

7. The medium of claim 6, wherein the UI configuration parameters comprise operating system, browser, language, locale, and resolution and wherein combination of a plurality of the UI configuration parameters, at least one of which has a plurality of options, initially populates the cells of the matrix.

8. The medium of claim 6, comprising execute the number of predetermined tests on a number of applications in combination with the reduced number of UI configurations of the matrix.

9. The medium of claim 8, comprising execute the number of predetermined tests on the number of applications in mirroring mode in the plurality of environments.

10. The medium of claim 6, wherein the reduced number of UI configurations is based upon selection of particular configuration parameter options to be supported by a UI and the predetermined tests are applied to functions of the UI to determine whether defects result.

11. The medium of claim 10, wherein the instructions further cause the computer to:
create a plurality of client environments, as determined by the selection of the particular options for the configuration parameters as particular UI configurations, to simulate what is displayed to a user and is accessible through the UI during application of the predetermined tests to determine whether defects result.

12. The medium of claim 6, wherein to track test results comprises to attach to a particular UI configuration at least one of:
an indicator of a number of defects determined by testing of the particular UI configuration; and
an indicator of a number of tests performed on the particular UI configuration.

13. The medium of claim 12, wherein the instructions further cause the computer to:
apply a threshold to at least one of the indicators to determine whether the particular UI configuration is covered.

14. The medium of claim 6, wherein the instructions further cause the computer to:
assign at least one of the first subset and the second subset to a release; and
split the first subset and the second subset between cycles.

15. The medium of claim 6, wherein the instructions further cause the computer to:
distribute a plurality of predetermined tests as test sets and split a plurality of UI configurations between at least two test sets based upon application of a number of rules to enable each UI configuration to be tested by application of an appropriate predetermined test in the test set to which each UI configuration is split.

16. A system to determine user interface (UI) coverage, comprising:
a processing resource in communication with a non-transitory machine readable medium that includes a set of instructions and wherein the processing resource executes the set of instructions to:
split a plurality of UI configuration parameters into development and QA cycles that are based on a project timeline; and
assign a first subset of the plurality of UI configuration parameters a lower testing frequency as compared to a second subset of the plurality of UI configuration parameters based on the development and QA cycles, wherein a configuration parameter option in the first subset is less utilized with a particular UI as compared to a configuration parameter option in the second subset;
reduce a number of cells of a matrix by combination of at least two independent UI configuration parameters of the plurality of UI configuration parameters to determine a reduced number of UI configurations;
assign a number of the reduced number of UI configurations to a predetermined test set based on the assignments, wherein the test set comprises a plurality of predetermined tests;
create a plurality of environments in a cloud to test the assigned number of UI configurations;
execute the predetermined test set in the cloud on the assigned number of UI configurations;
attach at least one of a plurality of indicators based upon a criticality level of a detected defect of a particular UI configuration on at least one of an appearance and a functionality of the particular UI configuration; and
track test results for each of the reduced number of UI configurations of the matrix to determine the UI coverage.

17. The system of claim 16, wherein the plurality of environments in the cloud is the same number as the assigned number of UI configurations to be tested.

18. The system of claim 16, wherein the processing resource executes the set of instructions to record a defect of a UI based upon input of the assigned number of UI configurations.

19. The system of claim 18, wherein the processing resource executes the set of instructions to reproduce the defect in an environment in the cloud and deploy a code fix to relevant code of the defect.

20. The system of claim 16, wherein the processing resource executes the set of instructions to structure a number of graphic representations of the test results based upon hierarchical representation of the parameters of the UI configurations.

* * * * *